Dec. 18, 1962  H. F. STERLING  3,069,244
PRODUCTION OF SILICON
Filed July 5, 1960

Inventor
H.F. Sterling
By
Attorney 3,069,244
PRODUCTION OF SILICON
Henley Frank Sterling, London, England, assignor to International Standard Electric Corporation, New York, N.Y.
Filed July 5, 1960, Ser. No. 40,690
Claims priority, application Great Britain July 17, 1959
1 Claim. (Cl. 23—277)

The present invention relates to methods and apparatus for the production of silicon of high purity.

A process and apparatus for the production of a coherent body of silicon by the thermal decomposition of silane gas was described in British patent specification No. 745,698 (Wilson et al.) and an improved form of process and apparatus was disclosed in British application No. 31,425/56 (Sterling). Whilst capable of producing silicon to a high degree of purity the inventions described in these specifications were not entirely satisfactory from the point of view of efficiency. A certain amount of the silane was decomposed in a gaseous rather than a surface reaction and the silicon produced in this manner was deposited upon various parts of the apparatus in the form of a dust. After a time the dust agglomerated into a "solid" form and built up at strategic points of the apparatus causing blocking and other troubles.

It is therefore an object of the present invention to improve the efficiency of the silane decomposition process by reducing the amount of silicon deposited as dust.

Accordingly the present invention provides a method of producing a coherent body of substantially pure silicon comprising heating a surface to the decomposition temperature of silane, passing silane gas in a molecular concentration substantially less than normal on to the said surface, and passing a further gas into the volume surrounding the said silane gas in such manner that the said further gas is kept at a temperature below the said decomposition temperature, the said further gas being one which is inert to silane gas and to the products of the decomposition of silane.

In the above statement the expression "molecular concentration substantially less than normal" means that the number of silane molecules per cubic centimetre is substantially less than the number present in one cubic centimetre of pure silane gas at atmospheric pressure, and at the decomposition temperature.

Figure 1:
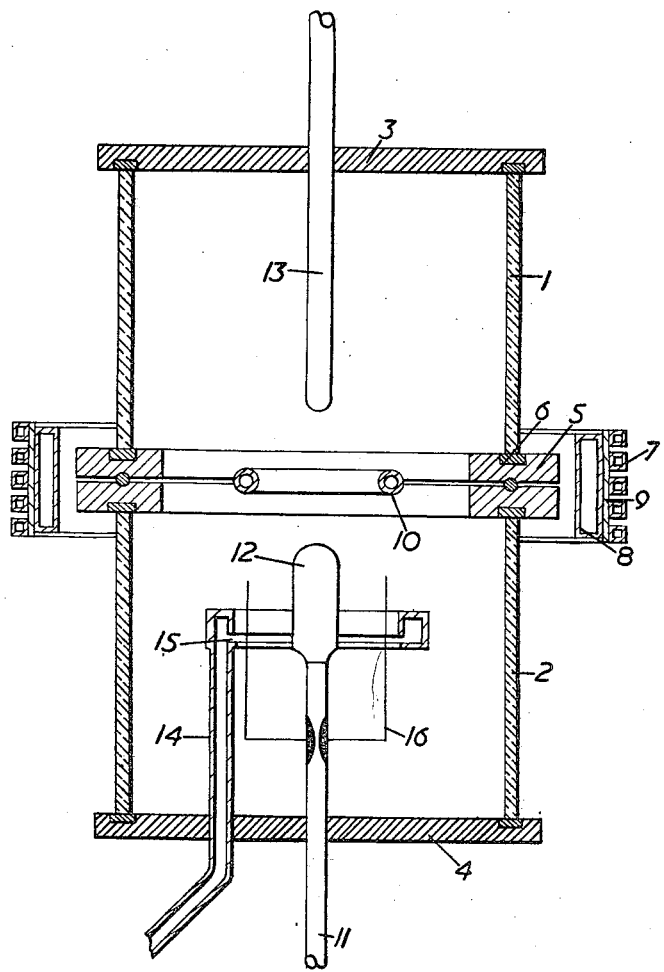
Figure 2:
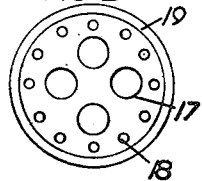

The invention will be described with reference to the accompanying drawings in which:

FIG. 1 shows a sketch of an apparatus for producing silicon according to the invention; and FIG. 2 shows a section through the gas inlet pipe of the apparatus shown in FIG. 1.

The apparatus shown in FIG. 1 comprises a decomposition chamber made from two glass cylinders 1 and 2, and two metal end-plates 3 and 4. Two upper sealing rings 5 and their associated neoprene washers 6 join the cylinders together. Surrounding the central portion of the chamber is a primary coil 7 and a secondary coil 8, separated from one another by an insulating spacer 9, and inside the chamber is a third coil, the "work" coil 10. All three coils are hollow and water-cooled. The primary coil 7 is connected to the output circuit of a R.F. generator (not shown).

A spindle 11 is provided for carrying a seed crystal of silicon 12 and is mounted such that it can be rotated or moved axially relative to the chamber. Gases may be admitted to the apparatus through a gas inlet pipe 13 and removed through an outlet pipe or "counter jet" 14. The latter ends in the form of an annular tube having a slot 15 cut circumferentially therein and is connected at its other end to a vacuum pump (not shown). Two wipers 16 are mounted upon the spindle 11 and are used for keeping the slot 15 clear of silicon dust.

A section through the inlet pipe 13 is shown in FIG. 2. It consists of four tubes 17 and twelve smaller tubes 18, all enclosed within an outer envelope 19.

Several factors determine the flow conditions of silane gas admitted into the apparatus and thus affect the amount of gas phase decomposition taking place, including the spacing between the work coil 10 and the silicon seed crystal 12, and the design of the inlet and outlet pipes 13 and 14, respectively. These parameters are therefore adjusted to give the minimum amount of gas phase decomposition, as indicated by the amount of silicon produced in the form of a dust, for any particular conditions of temperature, rate of flow and pressure of silane in use.

In operation R.F. currents flowing in the primary coil 7 are used to induce currents in the secondary coil 8, the work coil 10 and finally in the silicon seed crystal 12. These currents must be of sufficient magnitude to heat the tip of the seed crystal to a temperature above the decomposition temperature of silane gas.

The seed crystal 12 and wipers 16 are now rotated on the spindle 11 and very pure silane gas is admitted through the four tubes 17 of inlet pipe 13 in a molecular concentration substantially less than normal. Pure hydrogen gas is admitted through the twelve smaller tubes 18. The silane impinges upon the hot tip of the seed crystal 12 and is thermally decomposed into silicon and hydrogen on its surface and in the hot region immediately adjacent to it. Any undecomposed silane, together with the hydrogen from inlet pipe 13 and that produced in the decomposition process, is removed through the outlet pipe 14.

The spindle 11 is gradually lowered throughout the growth of the seed crystal 12 at such a rate that the tip always remains in the same position relative to the work coil 10.

Even with the correct spacing between the work coil 10 and the seed crystal 12 a certain amount of the silane would still be decomposed in the volume of hot hydrogen that is produced in the decomposition process and surrounds the seed crystal 12. Such a gas phase decomposition would give rise to silicon in the form of a dust. It is for the purpose of restricting the hot gases into a region as near to the tip of the seed crystal as possible that cool hydrogen is passed into the chamber through the tubes 18. This hydrogen forms a cool blanket around the stream of silane, keeping the hot hydrogen from the decomposition process in as small a volume as possible and also helping to direct the silane on to the tip of the seed crystal 12. Silicon is therefore formed in a substantially wholly surface reaction rather than a gaseous reaction, most of it being deposited on the seed crystal 12, which grows in the form of a coherent body, rather than in the surrounding regions in the form of dust.

Although hydrogen was used as the surrounding gas in the above description it should be borne in mind that this is not the only one suitable and in fact any gas that is inert to silane and the products of the silane decomposition process, and does not attack any parts of the apparatus can be used. For example one of the inert gases, such as helium, is equally satisfactory.

It is to be understood that the foregoing description of specific examples of this invention is not to be considered as a limitation of its scope.

What I claim is:

Apparatus for producing a coherent body of substantially pure silicon comprising a decomposition chamber, means for supporting a seed crystal of silicon within the said chamber, means for heating the said seed crystal to a temperature above the decomposition temperature of silane, a central jet for passing silane gas in a molecular concentration substantially less than normal on to the said seed crystal, a plurality of outer jets disposed around said central jet for passing an envelope of a further gas serving as a coolant into the region surrounding the said silane gas, and an outlet pipe for withdrawing gases from the said chamber, said means for heating the said seed crystal compirsing a coil and means for supplying radio frequency currents to the said coil, one end of said outlet pipe being in the form of an annular tube having a circumferential slot the said tube surrounding the said means for supporting a seed crystal said apparatus further comprising two wipers mounted on said means for supporting a seed crystal and disposed in contacting relationship with said slot.

References Cited in the file of this patent

UNITED STATES PATENTS

| | | |
|---|---|---|
| 2,635,946 | Weber et al. | Apr. 21, 1953 |
| 2,763,581 | Freedman | Sept. 18, 1956 |
| 2,823,982 | Saladin et al. | Feb. 18, 1958 |
| 2,915,367 | Olson et al. | Dec. 1, 1959 |
| 2,916,359 | Ellis et al. | Dec. 8, 1959 |

FOREIGN PATENTS

| | | |
|---|---|---|
| 745,698 | Great Britain | Feb. 29, 1956 |
| 820,192 | Great Britain | Sept. 16, 1959 |